2,576,307

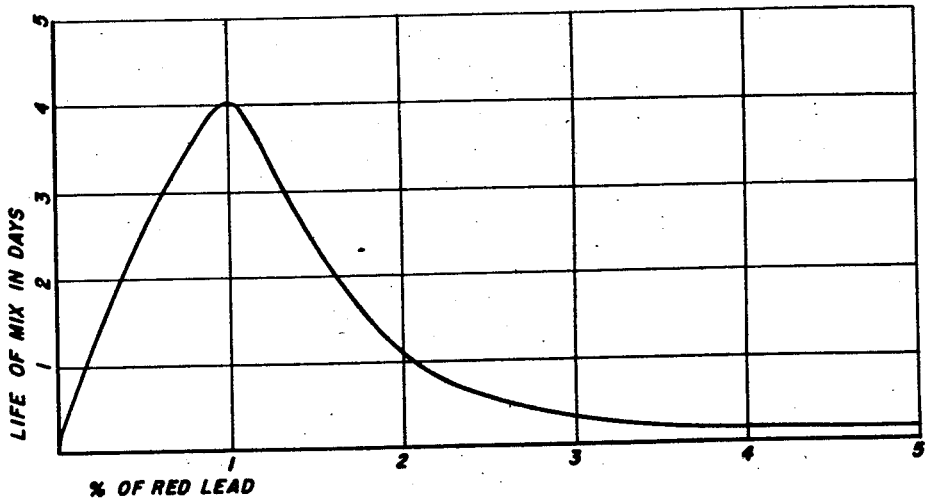
FIG. 1 — EFFECT OF RED LEAD ON STABILITY OF MIXES
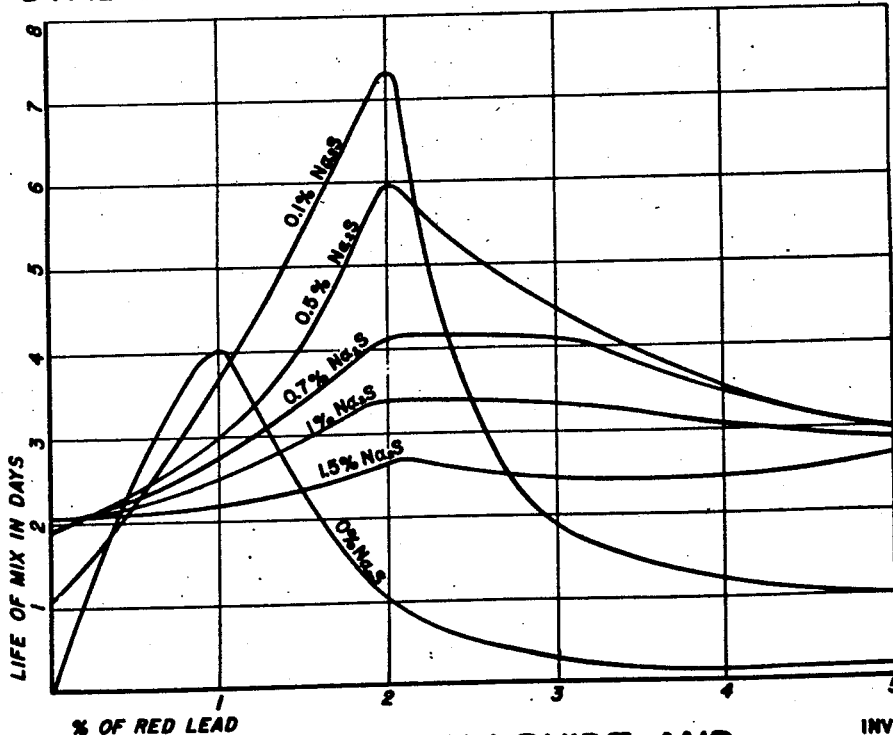
FIG. 2 — EFFECT OF SODIUM SULPHIDE AND RED LEAD ON STABILITY OF MIXES Patented Nov. 27, 1951

UNITED STATES PATENT OFFICE 2,576,307

COATING COMPOSITION AND METHOD OF MAKING

Peter Nordon, Bondi Junction, near Sydney, New South Wales, Australia, assignor to Industrial Metal Protectives, Inc., Wilmington, Del., a corporation of Delaware Application August 10, 1948, Serial No. 43,520
In Australia August 12, 1947

10 Claims. (Cl. 106—84)

This invention relates to improvements in coating compositions of the zinc dust-alkali silicate type, which are adapted for use on metal surfaces, and which may or may not be baked to render them insoluble.

Coating compositions of this type are in a state of delicate equilibrium, primarily owing to two factors, namely:

(1) There is a relatively high concentration of silicic acid present as a colloidal solution which readily precipitates as a gel; and (2) The zinc dust is in an extremely fine state of sub-division and is highly susceptible to attack by the alkaline silicate.

The coating produced by these zinc dust-alkali silicate mixes is, finally, tough and insoluble, which is thought to be due to a chemical or physical combination between the zinc dust and the silicate. Thus, it is known that an alkali silicate by its own, or an alkali silicate to which an inert pigment such as carbon black has been added, produces a coating which is still soluble even after baking at 250° F. On the other hand, if zinc dust, especially if it is very finely divided, is added to the alkali silicate, then baking to 250° F. will produce substantial insolubility.

It is, therefore, clear that any treatment given to the zinc dust, for whatever purpose, should not so alter its chemical or physical state as to entirely prevent the reaction between the zinc dust and the alkali silicate.

As mentioned previously, the zinc dust in the usual zinc dust-alkali silicate compositions is attacked rapidly by the alkaline silicate, hydrogen being evolved. This is known in the trade as "frothing," and is a serious disadvantage, since a mix which has "frothed" is found in practice to be unsuitable for use as a coating composition. The films produced by compositions which have "frothed" have poor adhesion. Furthermore, the mixture thickens rapidly and finally sets in a relatively short time. Consequently, it is necessary to use the coating composition almost immediately after mixing. This requires that the zinc dust and alkali silicate be packed in separate containers, the two being mixed as required. Even so, it is not always possible to gauge accurately the amount of coating composition required for the particular job in hand, and, as a result, there is generally considerable wastage.

Accordingly, it is an object of this invention to provide a coating composition of the zinc dust-alkali silicate type which does not need to be used immediately after mixing, and which will keep for comparatively long periods after mixing before setting.

It is another object of this invention to provide a coating composition of the sodium silicate metal dust type which can easily be applied to metal surfaces and will firmly adhere thereto to protect such surfaces from corrosion.

It is a still further object of this invention to provide a method of preparing an improved coating composition of the zinc dust-alkali silicate type which can easily be practiced and will create a coating composition which will keep for a relatively long period of time before setting.

These and other objects and advantages of the present invention will appear more clearly from the following description in connection with the accompanying drawings in which:

Figure 1 illustrates a graph showing the influence of red lead on the stability of mixes according to the invention, while Figure 2 shows a number of graphs illustrating the effect of sodium sulphide and red lead on the life of the mixes.

According to this invention a coating composition of the zinc dust-alkali silicate type comprises a mixture of zinc dust and alkali silicate solution in which the zinc dust particles are provided with a film or coating which is relatively stable under the alkaline conditions encountered in the alkali silicate solution.

By "relatively stable" is meant a film which will produce a substantial increase in the usable life of the composition without at the same time so altering the state of the zinc dust as to render it, in effect, completely inert to the alkali silicate.

According to one embodiment of this invention the said thin film or coating consists of any one or more of the compounds comprising waxes, organic fats which are not saponifiable under the conditions of use, and synthetic resins.

The zinc dust may be coated with such a film in a number of ways. A convenient method is to make a solution of the wax or other material in an inert solvent. A convenient amount of solution is then mixed to a stiff paste with the zinc dust, and the solvent is then allowed to evaporate.

In the undermentioned example the following procedure was adopted. 100 grammes of zinc dust were treated with the stated quantity of wax, fat, or other compound dissolved in 15 milliliters of the stated solvent. The solvent was then evaporated and the zinc dust used to prepare coating compositions having the following formulae:

Formula A

Treated zinc dust _____ grms__ 100
Sodium silicate (specific gravity 1.3, ratio Na₂O:SiO₂=1:2.6 defined in moles)
_____ milliliters__ 31

Formula B

Treated zinc dust _____ grms__ 98
Red lead _____ grms__ 2
Sodium silicate (specific gravity 1.3, ratio Na₂O:SiO₂=1:2.6 defined in moles)
_____ milliliters__ 31

EXAMPLE I 100 grms. of zinc dust were treated with 0.12 grm. of castor oil dissolved in acetone. A coating composition prepared according to Formula A had a life of 17 hours as against a life of 2 to 3 hours for a mix using untreated zinc. A coating composition prepared according to Formula B had a life of 1½ days.

EXAMPLE II 100 grms. of zinc dust were treated with 0.01 grm. of paraffin wax dissolved in benzol. A coating composition prepared according to Formula A had a life of 1½ days, and one prepared according to Formula B had a life of 2 days.

EXAMPLE III 100 grms. of zinc dust were treated with 0.5 ml. of alkyd resin dissolved in butanol. A coating composition prepared according to Formula A had a life of 20 hours, and one prepared according to Formula B had a life of 2 to 3 days. Similar results were obtained when a urea-formaldehyde resin was used in place of the alkyd resin.

EXAMPLE IV 100 grms. of zinc dust were treated with 0.01 grm. of carnauba wax dissolved in benzol. A coating composition prepared according to Formula A had a life of 19 hours, and one prepared according to Formula B had a life of 3 days. Similar results were obtained with the carnauba wax replaced by beeswax.

In a modification of the invention the zinc dust is chemically treated to provide a coating of a compound on the particles thereof such that the said compound is relatively unaffected by the alkali at the concentration present in the alkali silicate solution. In general 100 grms. of zinc dust are moistened with an aqueous solution (approximately 15 ml.) of the reactant. The resulting paste is dried, ground, and the zinc dust then used in an otherwise normal mix.

EXAMPLE V 0.2 grm. of sodium sulphide nonahydrate was dissolved in 15 ml. of water, the solution mixed into the zinc dust, and the resulting paste dried and ground. A mix prepared according to Formula A given above had a life of 15 hours, and one prepared according to Formula B had a life of 2 days. The mixes had partially set in 2 and 7 days respectively.

By the word "life" as used herein is meant the period during which the mix substantially retains its original painting consistency. After this period the mix may still be suitable for application as a coating but may need thinning with water to give painting consistency. By "partially set" is meant that lumps have begun to form in the mix. Mixes which have "partially set" can sometimes be used by grinding, as in a ball mill, and thinning with water to painting consistency. The coating obtained, however, is likely to be unsatisfactory.

EXAMPLE VI

The sodium sulphide of Example V was replaced by 0.5 grm. of ammonium sulphide. A mix prepared according to Formula A from the treated zinc dust had a life of 15 hours and partially set in 2 days, whilst a mix prepared according to Formula B had a life of 2 days and partially set in 8 days.

EXAMPLE VII

The sodium sulphide of Example V was replaced by 0.5 grm. of ammonium carbonate. A mix prepared according to Formula A had a life of 2½ hours and partially set in 6 hours, whilst a mix prepared according to Formula B had a life of 6 days and partially set in 10 days.

In a further modification, the zinc dust is not treated chemically, but the compound with which it may be treated is incorporated in the silicate solution either before the zinc dust is added thereto or together with the zinc dust. Frothing and rate of gellation are also reduced with this modification, presumably due to a preferential reaction between zinc dust and the said compound to form a coating on the surface of the zinc particles.

EXAMPLE VIII

The mix had the following composition.
Zinc dust _____ grms__ 100
Sodium sulphide (nonahydrate) _____ grm__ 0.25
Sodium silicate (specific gravity 1.3; Na₂O:SiO₂=1:2.6 defined in moles) _____ milliliters__ 31

The sodium sulphide was dissolved in the sodium silicate, and this solution substituted for the sodium silicate normally used. This mix had a life of 4 to 5 days, and had partially set in 10 days. The sodium sulphide may also be added with the zinc dust if desired.

EXAMPLE IX

The mix had the following composition.
Zinc dust _____ grms__ 100
Potassium iodate _____ grm__ 0.5
Sodium silicate (S. G. 1.3; Na₂O:SiO₂=1:2.6 defined in moles) _____ ml__ 31

Since the potassium iodate is insoluble in the silicate solution, it was added to the sodium silicate at the same time as the zinc dust. The mix had a life of 5 to 6 days, and partially set in 15 days.

EXAMPLE X

The mix had the following composition.
Zinc dust _____ grms__ 100
Disodium hydrogen phosphate _____ grm__ 0.3
Sodium silicate (S. G. 1.3; Na₂O:SiO₂=1:2.6 defined in moles) _____ ml__ 31

The phosphate may be premixed with the silicate or added at the same time as the zinc dust. The mix had a life of 5 hours and partially set in 19 hours.

The amount of said compound (sodium sulphide, etc.) used to give the desired life depends on a number of factors, some of which are:

1. The purity and state of subdivision of the zinc dust;

2. The purity of the alkali silicate; and
3. The alkalinity of the alkali silicate.

The amount required is best determined by experiment. However, in general, the quantity of said compound is not critical. With the particular zinc dust and silicate used in Example VIII increasing the sodium sulphide above 0.5 grm. did not cause any appreciable increase in life of the mix.

It has also been found that additions of small amounts of red lead and other lead compounds to the above mixes will increase both the life of the mix and the period before partial setting occurs. It is well known that red lead and other lead compounds when added in sufficient quantities to ordinary zinc dust-alkali silicate mixes will cause rapid setting of the mix. It has now been found that if relatively small amounts only of lead compounds, and particularly red lead, are added to these coating compositions both the life and the time before partial setting occurs are both increased.

With coating compositions of known type it has been found that the life of a mix of the type previously referred to as Formula A increases rapidly with increase of added red lead up to 1% of the zinc dust in the mix and then falls off rapidly with further increase in red lead, as will be obvious from Figure 1 of the drawing.

EXAMPLE XI

| | | |
|---|---|---|
| Zinc dust | grms | 100 |
| Sodium silicate (S. G. 1.3; Na$_2$O:SiO$_2$=1:2.6 defined in moles) | ml | 31 |
| Red lead | grm | 1 |

A mix having the proportions given above had a life of approximately 4 days. This should be compared with mixes containing no red lead, or 5% red lead, which have a life of 2-3 hours and set solid in 6 to 7 hours.

With mixes in which the zinc dust is provided with a film or coating, the effect of the red lead is not so critical, and a higher percentage of red lead may be added. Example I to VII, in the case of mixes prepared according to Formula B, give examples of mixes using approximately 2% of red lead, and it will be noted that the addition of this amount of red lead causes a marked increase in the life and of the period before partial setting occurs.

Further examples showing the use of red lead are given below.

EXAMPLE XII

| | | |
|---|---|---|
| Zinc dust | grms | 98 |
| Red lead | grms | 2 |
| Sodium sulphide (nonahydrate) | grm | 0.1 |
| Sodium silicate (S. G. 1.3; Na$_2$O:SiO$_2$=1:2.6 defined in moles) | ml | 31 |

The life of this mix was 7-8 days, and it partially set in 11-12 days.

EXAMPLE XIII

| | | |
|---|---|---|
| Zinc dust | grms | 98 |
| Red lead | grms | 2 |
| Disodium hydrogen phosphate | grm | 0.3 |
| Sodium silicate (S. G. 1.3; Na$_2$O:SiO$_2$=1:2.6 defined in moles) | ml | 31 |

The life of this mix was 2 days, and it partially set in 7 days.

In the case of the coating composition of Example XI, it has been found that, if the proportion of red lead (based on the weight of the zinc dust) is varied, then the life of the mix increases fairly rapidly as the red lead is increased, having a maximum of 7-8 days with 2% red lead, and falls off rapidly to approximately 1 day with further increase of red lead beyond 2%. If the percentage of sodium sulphide nonahydrate is increased then the effect of the red lead becomes less marked, and much less critical, and when the percentage of the sulphide has been increased to 1.5% (based upon the weight of zinc dust) the addition of red lead appears to have little effect upon the life of the mix. This is clearly visible from Figure 2 of the drawing. A mix according to Example XI with the sodium sulphide increased to 0.25 grm. is preferred at present, and has a life of approximately 6 to 7 days.

In general, compositions prepared in accordance with this invention will dry slower when applied as coatings and will require higher baking temperatures than known compositions.

The sodium silicate is preferably of the type in which the Na$_2$O:SiO$_2$ ratio defined in moles lies between 1:2.4 and 1:2.6 inclusive. However, this invention is not limited to compositions employing sodium silicates having ratios falling in this range. Higher ratios than 1:3.0 will give brittle coatings, however, and should be avoided for most purposes. The zinc dust actually used in the above examples had an average particle size of 2.5 microns, but the invention is not to be limited to the use of particles having that size. The mixes described in the above samples were all prepared and maintained at room temperature (approx. 60° F.).

It is, of course, understood that the present invention is by no means limited to the specific composition and method described, but also comprises any modification within the scope of the appended claims.

I claim:

1. A method of preparing a coating composition of the zinc dust-alkali silicate type, which includes the steps of (a) dissolving 0.5 gramme of ammonium sulphide in 15 milliliters of water, (b) mixing the solution into zinc dust to provide said dust with a coating effective to prevent frothing and to increase the life of the mixture, (c) drying and grinding the resulting paste, and (d) mixing 100 grammes of the thus treated zinc dust with 31 milliliters of an aqueous solution of sodium silicate having a specific gravity of 1.3, and having a ratio Na$_2$O:SiO$_2$, defined in moles, of 1:2.6.

2. A method of preparing a coating composition of the zinc dust alkali silicate type, which includes the steps of (a) dissolving 0.5 gramme of ammonium sulphide in 15 milliliters of water, (b) mixing the solution into zinc dust to provide said dust with a coating effective to prevent frothing and to increase the life of the mixture, (c) drying and grinding the resulting paste, (d) mixing 98 grammes of the thus treated zinc dust with 2 grammes of red lead, and (e) adding thereto 31 milliliters of an aqueous solution of sodium silicate having a specific gravity of 1.3, and having a ratio Na$_2$O:SiO$_2$, defined in moles, of 1:2.6.

3. A liquid coating composition comprising a dispersion of zinc dust in an aqueous solution of alkali metal silicate having a ratio of alkali metal oxide to silica defined in moles of 1:2.4 to 1:3.0, said zinc dust being provided with a film or coating of at least one of the compounds selected from the group consisting of ammonium sulphide and ammonium carbonate, said film or coating being effective to prevent frothing and to increase the life of the mixture.

4. A liquid coating composition comprising a dispersion of zinc dust in an aqueous solution of alkali metal silicate having a ratio of alkali metal oxide to silica defined in moles of 1:2.4 to 1:3.0, said zinc dust being provided with a film or coating of ammonium carbonate, said film or coating being effective to prevent frothing and to increase the life of the mixture.

5. A liquid coating composition comprising a dispersion of zinc dust in an aqueous solution of alkali metal silicate having a ratio of alkali metal oxide to silica defined in moles of 1:2.4 to 1:3.0, said zinc dust being provided with a film or coating of ammonium sulphide, said film or coating being effective to prevent frothing and to increase the life of the mixture.

6. A method of preparing a coating composition containing zinc dust dispersed in an aqueous solution of alkali metal silicate having a ratio of alkali metal oxide to silica defined in moles of 1:2.4 to 1:3.0 comprising the step of coating the zinc dust particles with a film of ammonium sulphide and mixing the thus treated zinc dust with alkali metal silicate, said film being effective to prevent frothing and to increase the life of the mixture.

7. A method of preparing a coating composition containing zinc dust dispersed in an aqueous solution of alkali metal silicate having a ratio of alkali metal oxide to silica defined in moles of 1:2.4 to 1:3.0 comprising the step of coating the zinc dust particles with a film of ammonium carbonate and mixing the thus treated zinc with the alkali metal silicate, said film being effective to prevent frothing and to increase the life of the mixture.

8. A method of preparing a coating composition of the zinc dust-alkali metal silicate type, which includes the steps of coating the zinc dust particles with a film of at least one of the compounds selected from the group consisting of ammonium sulphide and ammonium carbonate, said film being effective to prevent frothing and to increase the useful life of the mixture, and mixing the thus treated zinc dust with an aqueous solution of alkali metal silicate having the ratio of alkali metal oxide to silica defined in moles of 1:2.4 to 1:3.0.

9. A method of preparing a coating composition of the zinc dust-alkali metal silica type which includes the steps of preparing a solution containing at least one compound of the group consisting of ammonium sulphide and ammonium carbonate, mixing the zinc dust with said solution in an inert solvent to a stiff paste, evaporating the solvent whereby said zinc dust is provided with a thin film of one of said compounds effective to prevent frothing and to increase the useful life of the mixture, and mixing the thus treated zinc dust with an aqueous solution of an alkali metal silicate having a ratio of alkali oxide to silica defined in moles of 1:2.4 to 1:3.0.

10. A method of preparing a coating composition of the zinc dust-alkali metal silicate type, which includes the steps of pre-treating in an inert solvent the zinc dust with a solution of one of the compounds selected from the group consisting of ammonium sulphide and ammonium carbonate, evaporating said solvent whereby said zinc dust is provided with a film of one of said compounds effective to prevent frothing and to increase the life of the mixture and mixing the thus treated zinc dust with an aqueous solution of an alkali metal silicate having a ratio of alkali metal oxide to silica defined in moles of 1:2.4 to 1:3.0.

PETER NORDON.

REFERENCES CITED

The following references are of record in the file of this patent:

UNITED STATES PATENTS

| Number | Name | Date |
| --- | --- | --- |
| 1,110,808 | Basile | Sept. 15, 1914 |
| 1,452,445 | Seideman | Apr. 17, 1923 |
| 2,263,070 | Cusick | Nov. 18, 1941 |
| 2,440,969 | Nightingall | May 4, 1948 |
| 2,462,763 | Nightingall | Feb. 22, 1949 |

FOREIGN PATENTS

| Number | Country | Date |
| --- | --- | --- |
| 6,755 | Great Britain | of 1907 |
| 15,131 | Australia | of 1928 |
| 104,231 | Australia | of 1938 |